United States Patent [19]

Spilsbury

[11] 4,297,618

[45] Oct. 27, 1981

[54] ANODE VOLTAGE DEFLECTION GAIN CONTROL FOR CATHODE RAY DISPLAYS

[75] Inventor: Thomas W. Spilsbury, Phoenix, Ariz.

[73] Assignee: Sperry Corporation, New York, N.Y.

[21] Appl. No.: 187,039

[22] Filed: Sep. 15, 1980

[51] Int. Cl.³ .......................................... H01J 29/56
[52] U.S. Cl. .................................. 315/371; 315/375; 358/73
[58] Field of Search ............... 315/382, 370, 371, 375; 358/72, 73

[56] References Cited

U.S. PATENT DOCUMENTS 3,772,566 11/1973 Schwartz ........................... 315/382
4,092,566 5/1978 Chambers et al. .................. 358/73
4,223,252 9/1980 Doran .................................... 358/73
4,258,298 3/1981 Hilburn et al. ...................... 315/382

*Primary Examiner*—Theodore M. Blum
*Attorney, Agent, or Firm*—Howard P. Terry

[57] ABSTRACT

A compensating gain control system provides improved operation of the deflection channels of cathode ray color displays, particularly a display of the penetration phosphor type. A sample of the indicator anode voltage is taken and the square root of the sample is derived. Each deflection current wave form is multiplied by the square root signal, thus providing a deflection drive current accurately scaled to anode voltage changes.

8 Claims, 1 Drawing Figure

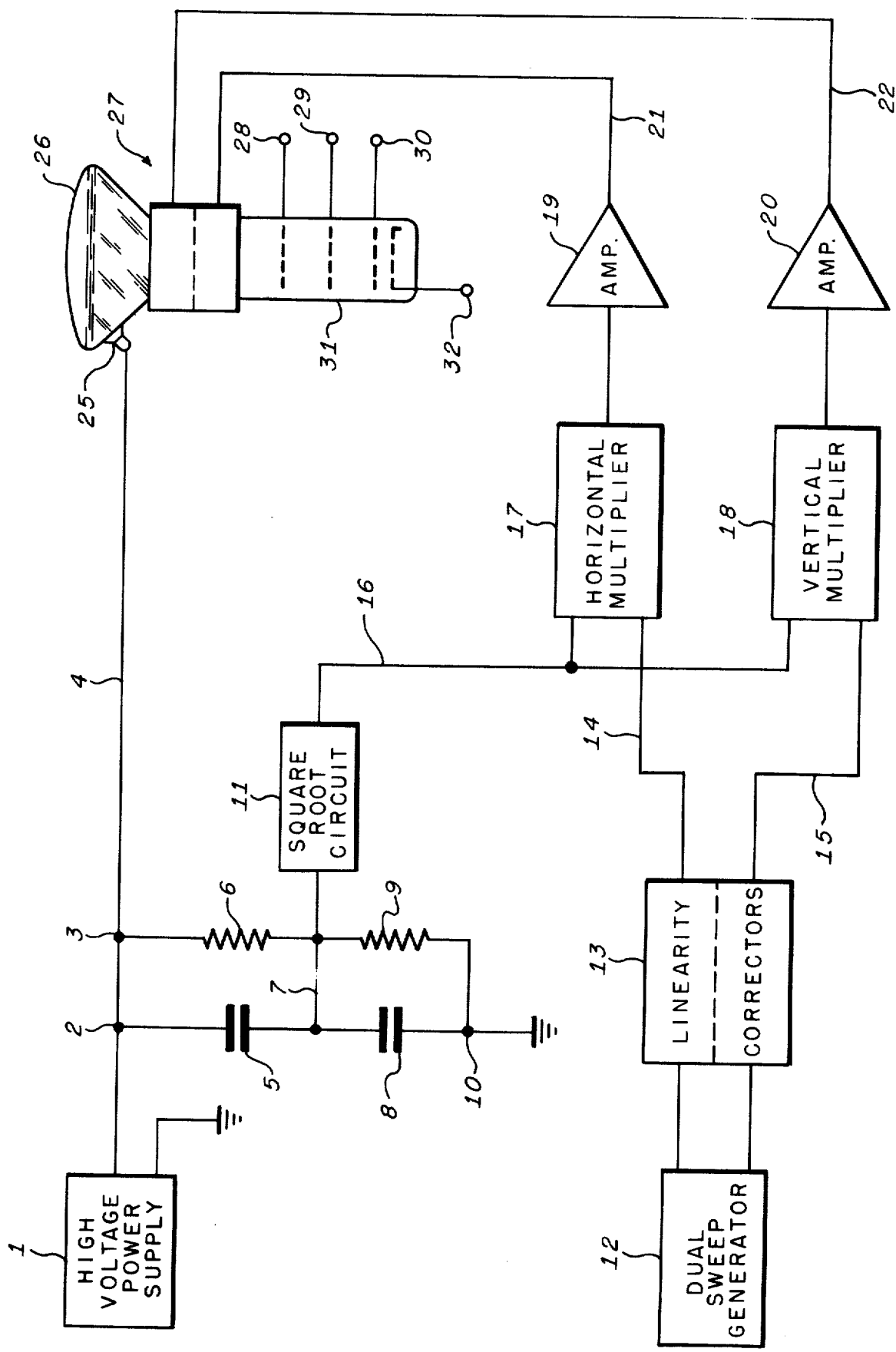

ANODE VOLTAGE DEFLECTION GAIN CONTROL FOR CATHODE RAY DISPLAYS

BACKGROUND OF THE INVENTION

1. Field of the Invention

The invention relates to cathode ray tube displays and more particularly to gain controls for the deflection systems of cathode ray displays of the phosphor penetration type employing rapidly selectable high anode or acceleration voltages and providing improved color displays.

2. Description of the Prior Art

Penetration phosphor cathode ray tubes are attractive for use in displays wherein their bright color producing capabilities permit the presentation of complex data in semipictorial forms quickly interpretable by the viewer. They are additionally attractive for use in such information displays, including displays for air traffic control, navigation, radar, and the like systems, because they provide images with uniform high resolution and good contrast.

A conventional penetration phosphor cathode ray tube has a viewing screen which uses controlled penetration of electrons into a series of phosphor layers for producing therein light of a corresponding series of colors. For example, the screen may include two or more different phosphor layers, each very thin, uniform, and separated by a transparent dielectric layer. When the electron beam is driven by a relatively low voltage, the energy of the electrons is not sufficient to penetrate the dielectric barrier layer; only the phosphor of the first layer is excited and only its color is produced. At higher electron beam voltages and correspondingly higher electron energies, the phosphors of both of the first and second layers are excited, the intensity of the color contribution by the second layer phosphor increasing as the electron beam energy is increased.

Full use may be made of the penetration phosphor characteristics in providing a variable color display while using only one electron beam simply by controlling the voltage on the beam acceleration electrode adjacent the focusing electrode. With red and green emitting phosphors, successive changes in the beam acceleration voltage generate distinct colors; for example, red, orange, yellow, or green may thus be generated. Only one suitably controlled electron gun is required and the apertured masks of prior art color television tubes are eliminated along with other features undesirable for use in fast high resolution information displays. A further understanding of the construction and operation of such penetration phosphor displays is found in the following Sperry Corporation U.S. patents:

S. F. Ignasiak, U.S. Pat. No. 3,939,377 for "Penetration Phosphors and Display Devices", issued Feb. 17, 1976, C. D. Lustig, J. B. Thaxter, U.S. Pat. No. 3,946,267 for "Plural Filter System Cooperating With Cathode Ray Display with Lanthanum Host Phosphor Emissive in Two Colors," issued Mar. 23, 1976, and S. F. Ignasiak, U.S. Pat. No. 4,071,640 for "Penetration Phosphors for Display Devices," issued Jan. 31, 1978.

In the penetration phosphor kind of cathode ray tube display, where the anode beam acceleration voltage is changed over wide ranges, the effective stiffness of the electron beam changes widely, and a proportionately greater beam deflection current is required as the electron beam acceleration voltage is increased in order to deflect the beam through a predetermined horizontal or vertical deflection angle. While the existence of this problem appears to have been recognized in the past, continuous and instantaneous gain changing was not satisfactorily accomplished even by the use of the discrete analog switch-resistor control matrix, an arrangement inprecise and not effective in the very rapid display of data. Furthermore, relatively precise anode power supply regulation was required, since the effects of any power supply ripple present were not otherwise eliminated.

SUMMARY OF THE INVENTION

The present invention is a gain control system for the deflection amplifier channels of a cathode ray color display of the penetration phosphor type, for example. A sample of the cathode ray tube display anode voltage is taken and its square root is derived. Each deflection current wave form is multiplied by the square root signal, thus providing a deflection drive current accurately scaled to anode voltage changes. Anode ripple effects on the deflection of the electron beam are at the same time conveniently eliminated. The high voltage ripple effects are automatically rejected by scaling the deflection current in synchronism with the ripple, thereby enabling the use of a simple relatively unregulated high voltage power supply.

BRIEF DESCRIPTION OF THE DRAWING

The sole FIGURE presents a wiring diagram of the invention, showing its components and electric interconnections.

DESCRIPTION OF THE PREFERRED EMBODIMENTS

The novel cathode ray display deflection gain control system, as shown in the sole FIGURE, has particular application for use in color display systems using cathode ray indicators of the penetration phosphor type. On the other hand, it may beneficially be employed also in other kinds of cathode ray display systems where the presence of effects of high anode voltage ripple or of variable loading are disadvantageous.

For convenience, the invention will be discussed in connection with a penetration phosphor type of cathode ray tube 31 to which a high anode voltage is supplied at terminal 25 via lead 4 from high anode voltage power supply 1. While generally conventional types of circuits may be used in power supply 1, a suitable arrangement is disclosed in the T. W. Spilsbury U.S. patent application Ser. No. 113,902 for a "High Voltage Switching Power Supply for Penetration Cathode Ray Displays," filed Jan. 21, 1980 and assigned to Sperry Corporation. The power supply of application Ser. No. 113,902 provides efficient switching of rapidly selectable high voltages for the anode or acceleration electrode of penetration phosphor cathode ray color displays. The arrangement employs a serially connected command decoder, a voltage regulator, a power oscillator, and a voltage divider for supplying a feed back voltage to the regulator for comparison purposes. Positive transitions of the high voltage output are directly accomplished in the power oscillator-voltage multiplier serving as a unidirectional voltage to unidirectional voltage converter. The apparatus is further supplied with a signal level detector responsive to the voltage regulator and employing a switching oscillator to control the conductivity state of a pull down switch coupled in shunt with respect to the anode voltage line. Negative transitions of the high voltage output are controlled by turning off the power oscillator and by pulling the output voltage down by making the pull down switch conductive.

Display tube 31 in FIG. 1 includes a viewable screen 26, usually raster scanned, and the anode voltage on lead 4 is supplied at a conventional acceleration electrode 25. Display tube 31 may include a cathode fed with video signals at terminal 32, at least one prefocusing or control grid coupled to terminal 30, which may be at ground potential, and a focusing electrode coupled to terminal 29, all operated in the usual manner. An accelerating electrode of cylinder form may be coupled at terminal 28 to lead 4 in lieu of the frustrated conical electrode coupled to terminal 25. The neck of the vacuum envelope of display tube 31 is surrounded by the usual cooperating vertical and horizontal deflection yoke system, as indicated at 27.

In general, the voltage on anode terminal 25 is varied in a penetration phosphor type of display to vary the color of the presentation. Accordingly, for a given cathode ray beam deflection angle $\theta$, the deflection coil current $I_d$ and the anode potential $E_{ca}$ are related according to the formula:

$$I_d = K \sin \theta \sqrt{E_{ca}}$$

where K is a constant that is characteristic of a given display tube-deflection coil combination. In usual applications of penetration phosphor display tubes, the anode voltage can change as much as ten kilovolts and a multiplicity of different anode voltages is often required, so that precise gain switching of the beam deflection amplifiers becomes difficult. According to the present invention, a sample of the high anode voltage on lead 4, including its direct component and any ripple imposed thereon is extracted, the square root of that sampled amplitude is derived, and the latter is multiplied by the amplitude of the deflection sweep current wave, producing a desired compensated sweep wave input for deflection yoke 27.

For this purpose, a sampling voltage power divider is coupled between junctions 2 and 3 of lead 4 and the grounded terminal 10. It consists in part of the path from junction 2 through series capacitors 5 and 8 to grounded terminal 10 and in second part of the path from junction 3 through series resistors 6 and 9 to ground. The useful output to square root extracting circuit 11 is derived on lead 7, which lead is coupled to the common electrodes of capacitors 5 and 8 and also to the common ends of resistors 6 and 9. Square root extracting circuit 11 is a conventional function generating circuit taking the root of the high voltage sample amplitude, plus ripple and transients, and supplying a useful compensating output on lead 16.

The dual sweep generator 12 is of the conventional kind producing vertical and horizontal scan voltages of the type, for instance, used in raster scanning of the electron beam. These signals may be subjected to linearity correction within conventional linearity correction circuits 13. One output of linearity corrector 13 appears on lead 14 and is coupled to one input of the conventional horizontal sweep multiplier circuit 17, the square root signal on lead 16 being coupled to a second input of the same multiplier 17. The compensated output of horizontal sweep multiplier 17 is coupled through a conventional power sweep current amplifier 19 and lead 21 to the horizontal deflection coil of deflection yoke system 27. In this manner, the cathode ray beam is deflected always to a predetermined value of the horizontal deflection angle $\theta$ independent of the acceleration voltage $E_{ca}$ or, in other words, independent of the color momentarily to be produced on the display screen 26.

In like manner, a second output of linearity corrector 13 appears on lead 15 and is coupled to one input of a vertical sweep multiplier 18, which may be generally similar to horizontal sweep multiplier 17, the same square root signal on lead 16 being coupled to a second input of vertical sweep multiplier 18. The compensated output of vertical sweep multiplier 18 is coupled through power sweep current amplifier 20 and lead 22 to the vertical deflection coil of deflection yoke system 27 with the similar beneficial result that the electron beam is always deflected to a predetermined value of the vertical deflection angle independent of the acceleration voltage $E_{ca}$.

While other known sweep current amplifiers may be used to fulfill the roles of horizontal sweep current amplifier 19 and of vertical sweep current amplifier 20, systems that may be used include those of the H. C. Hilburn U.S. Pat. No. 3,786,303 for a "Cathode Ray Tube Dual Mode Horizontal Deflection Control Amplifier," issued Jan. 15, 1974 and of the J. M. Spencer U.S. Pat. No. 3,816,792 for a "Cathode Ray Tube High Speed Electromagnetic Deflection System," issued June 11, 1974, both patents being assigned to Sperry Corporation.

Accordingly, it is seen that the invention overcomes difficulties in the prior art penetration phosphor display art by sampling the anode voltage of the cathode ray tube, by deriving the square root of that amplitude, and then by separately multiplying the square root value by each deflection sweep current producing a desired compensated sweep current wave for application in the cathode ray beam deflection yoke system. Beneficially, the effective gain change of the sweep system is instantaneous and continuous with changes in anode voltage. Once calibrated for one anode voltage, the deflection angle for a given sweep command will remain constant for any selected anode voltage. Furthermore, the invention rejects high voltage ripple effects by scaling beam deflection in synchronization with the ripple, thereby allowing the use of an unregulated high anode voltage supply.

While the invention has been described in its preferred embodiments, it is to be understood that the words which have been used are words of description rather than of limitation and that changes may be made within the purview of the appended claims without departing from the true scope and spirit of the invention in its broader aspects.

What is claimed is:

1. Cathode ray display apparatus including a cathode ray display tube having at least anode means, cathode means, and associated electron beam deflection coil means, power supply means for supplying an anode voltage to said anode means, sampling circuit means for deriving a sample of said anode voltage,
 square root signal extractor means responsive to said anode voltage sample, circuit means for generating a sweep signal, and multiplier means responsive to said square root signal and to said sweep signal for generating a compensated electron beam deflection current for driving said electron beam deflection coil means.

2. Apparatus as described in claim 1 further including sweep linearity control means responsive to said circuit means, said multiplier means being directly responsive to said sweep linearity control means.

3. Apparatus as described in claim 2 further including current amplifier means responsive to said multiplier means for directly driving said electron beam deflection coil means.

4. Apparatus as described in claim 1 wherein said cathode ray tube comprises a penetration phosphor cathode ray tube.

5. Apparatus as described in claim 4 wherein said power supply means comprises a power supply of the kind particularly adapted for use with said penetration phosphor cathode ray tube.

6. Apparatus as described in claim 1 wherein said sampling circuit means comprises:

first and second series capacitor means coupled between said anode voltage and ground, first and second series resistor means coupled between said anode voltage and ground, and output means coupled between said first and second series capacitor means and said first and second series resistor means, said square root extraction means being responsive to said output means.

7. Cathode ray display apparatus including:

a cathode ray display tube having at least anode means, cathode means, and first and second associated electron beam deflection means, power supply means for supplying an anode voltage to said anode means, sampling circuit means for deriving a sample of said anode voltage, square root signal extractor means responsive to said anode voltage sample, first and second circuit means for generating first and second sweep signals, and first and second multiplier means respectively responsive to said first and second sweep signals and both responsive to said square root signal for generating first and second respective compensated electron beam deflection currents for driving said respective first and second electron beam deflection means.

8. Cathode ray display apparatus of the kind adapted for operation with a cathode ray display tube having at least anode means, cathode means, and associated electron deflection means and including:

power supply means for supply of an anode voltage to said anode means, sampling circuit means for deriving a sample of said anode voltage, square root signal extraction means responsive to said anode voltage sample, circuit means for generating a sweep signal, and multiplier means responsive to said square root signal and to said sweep signal for generating a compensated electron beam deflection signal adapted for driving said electron beam deflection means.

* * * * *